Dec. 17, 1935.  W. L. GIFFORD  2,024,214

SUBMARINE SIGNALING APPARATUS

Filed Oct. 28, 1932

INVENTOR
WALLACE L. GIFFORD
BY
ATTORNEY

Patented Dec. 17, 1935

2,024,214

UNITED STATES PATENT OFFICE 2,024,214

SUBMARINE SIGNALING APPARATUS

Wallace L. Gifford, Salem, Mass., assignor to Submarine Signal Company, Boston, Mass., a corporation of Maine Application October 28, 1932, Serial No. 640,080

6 Claims. (Cl. 181—0.5)

The present invention relates to submarine sound diaphragms for use in receiving or sending sound waves for signaling purposes and for sound producers for depth sounding apparatus by the acoustic method, and perhaps more particularly to a method of producing a composite plate in which one surface of the plate is a stainless steel or non-corrodible surface.

In the present art the method generally employed is to make the whole plate from non-corrodible steel if such a surface is desired. It has been found practically impossible by the applicant to braze together a non-corrodible steel plate with a plate of other material. One of the reasons for this is that after the steel surface has been finished, the heating necessary in the brazing or other processes bring about a change in composition of the structure of the non-corrodible surface to such an extent that it does not stand up. Even if the brazing is done before the surface is finished and the surface is afterwards finished, the metal does not appear to have the same wearing qualities that it did before.

Further than this it is practically impossible to obtain over a large surface a perfect union so that in many cases the brazing does not hold or is not able to stand up under the vibrational stresses and the pressures to which it is subjected.

The applicant has discovered a method by which a composite plate may be made in which a non-corrodible surface can be provided and in which there is no uncertainty as to the union of the two different metals.

Figure 1:
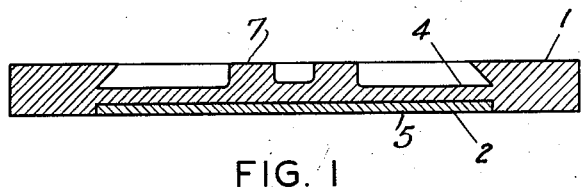
Figure 2:
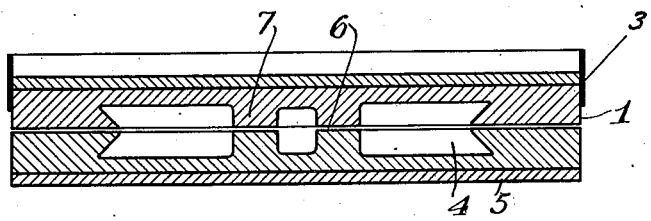
Figure 3:
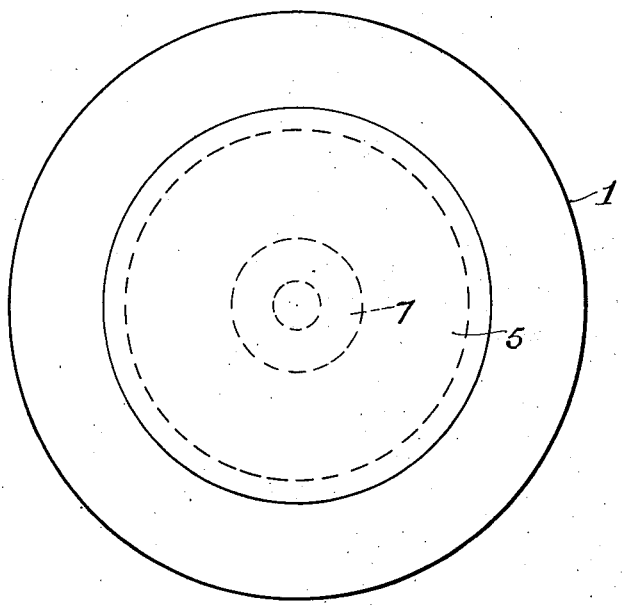

The present invention will be more fully described in connection with a submarine sound signaling diaphragm as illustrated in the drawing in which Figure 1 shows the composite plate applied by recessing the surface of the diaphragm; Figure 2 shows the submarine sound signaling device with a complete non-corrodible surface and Figure 3 shows a plan view of the plate shown in Figure 1.

In applying the surface to either type of diaphragm the method employed is substantially the same. In Figure 1 the diaphragm I may be first recessed as indicated in the recessed portion 2. This diaphragm may be constructed of most any type of metal, but it is usual to employ iron, steel or some alloy composition. The non-corrodible metal 5, which is preferably a stainless steel comprising a steel alloy, is deposited in the recessed portion 2 by means of a welding torch which is provided with a gas to prevent the oxidation of the melted metal. The non-corrodible metal is preferably used in the form of a drill rod and is melted in globules or flowed around in the recessed portion of the diaphragm 2. It is preferable in flowing the metal in the recessed portion or on the surface of the diaphragm to proceed in some uniform pattern as, for instance, around in a circle or back and forth until the whole surface is filled. The surface may be covered once or more according to how thick a coating of non-corrodible material it is desired to have. It is possible also to regulate the thickness of the coating by depositing more metal with each coating, but in each case it is preferable to fill or coat the entire surface uniformly.

In coating the diaphragm shown in Figure 2 a wall 3 may be built up temporarily about the edge of the metal surface and within this wall the surface of the diaphragm may be built up to the desired height. After the metal has been deposited and cooled, the whole diaphragm is applied to a grinding machine and the surface is ground smooth and polished.

In sound signaling apparatus it is frequently desired to tune diaphragms to certain sound frequencies or pitches and in the present case this may be and is accomplished by taking material from the inside 4 of the diaphragm rather than from the outer surface of the diaphragm. At the center of the plates are pole pieces 6 and 7 about which a coil may be placed for energizing the diaphragms which, as shown in Figure 2, may be opposed to one another.

If it is desired or necessary before polishing, the diaphragm may be heat treated to bring out the stainless steel properties of the surface and polished afterwards. By the present method of construction it is possible to provide a plate in which the surface is formed integrally with the whole mass and which is free from any heat stresses which may otherwise be present in the brazing of two different materials.

Diaphragms of the present construction have been particularly useful in submarine sound producers for depth sounding in which the diaphragm must necessarily have a very large amplitude and high damping. In such structures the diaphragm is worked more near its physical limit and frequently in such cases pitting of the diaphragm is apt to result. In the present type of diaphragm constructed according to the methods described above this difficulty has been practically avoided.

Having now described my invention I claim:

1. A submarine sound producer diaphragm comprising a metallic plate having on the surface adapted to be immersed in the water a thin plate of stainless steel welded to the plate.

2. A submarine sound producer diaphragm comprising a metallic base having the active diaphragm surface removed and non-corrodible steel metal welded therein replacing the same to form a continuous diaphragm surface.

3. A submarine sound producer diaphragm comprising a metallic base recessed in the portion that would normally be the active part of the diaphragm and non-corrodible steel metal flux welded in said recessed portion to form a continuous surface with the part of the diaphragm external of the active area.

4. A diaphragm having a base and a stainless steel coating therefor.

5. A diaphragm having a base comprising a body portion and a peripheral portion by means of which the diaphragm may be secured to a ship, the body portion having a stainless-steel coating and the peripheral portion being uncoated.

6. A diaphragm comprising a body portion having a recess in one face, and a stainless-steel layer in the recess.

WALLACE L. GIFFORD.